United States Patent

Conlin et al.

[11] Patent Number: 5,855,763
[45] Date of Patent: Jan. 5, 1999

[54] ELECTROCHEMICAL OXIDATION OF MATTER

[75] Inventors: Iain Conlin, Motherwell; Nigel Desmond Evan Warren; David Frame Steele, both of Caithness, all of United Kingdom

[73] Assignee: AEA Technology plc, Didcot, United Kingdom

[21] Appl. No.: 737,167
[22] PCT Filed: May 24, 1995
[86] PCT No.: PCT/GB95/01186
§ 371 Date: Nov. 5, 1996
§ 102(e) Date: Nov. 5, 1996
[87] PCT Pub. No.: WO95/33523
PCT Pub. Date: Dec. 14, 1995

[30] Foreign Application Priority Data

Jun. 4, 1994 [GB] United Kingdom ............... 9411212

[51] Int. Cl.[6] ................................................. C02F 1/461
[52] U.S. Cl. ........................ 205/688; 205/742; 588/204; 588/210; 588/227; 210/702; 204/263; 204/275
[58] Field of Search ................... 205/688, 742; 588/204, 210, 227; 210/702, 712; 201/28; 202/82; 204/263, 275

[56] References Cited

U.S. PATENT DOCUMENTS

| | | | |
|---|---|---|---|
| 4,869,794 | 9/1989 | Koehly et al. | 205/766 |
| 4,874,485 | 10/1989 | Steele | 205/688 |
| 4,939,256 | 7/1990 | Takamatsu et al. | 546/11 |
| 5,516,972 | 5/1996 | Farmer et al. | 205/639 |

FOREIGN PATENT DOCUMENTS

| | | |
|---|---|---|
| 0158555 | 10/1985 | European Pat. Off. |
| 2296984 | 12/1988 | European Pat. Off. |
| 2108529 | 5/1983 | United Kingdom. |

Primary Examiner—Arun S. Phasge
Attorney, Agent, or Firm—William H. Holt; William R. Hinds

[57] ABSTRACT

Decomposition of waste and particularly organic waste matter is carried out in an electrochemical cell (11) in which the electrolyte comprises nitric acid containing silver ions as an electrochemically regenerable primary oxidizing species. A separation plant (34) for continuously or periodically withdrawing anolyte is operated to remove or reduce contamination of the anolyte with anions of or containing phosphorus, sulphur, nitrogen or halogens.

17 Claims, 2 Drawing Sheets

ELECTROCHEMICAL OXIDATION OF MATTER

This application is a 371 of PCT/GB95/01186 filed May 24, 1995.

The invention relates to a method and apparatus for the electrochemical oxidation of matter and has particular application in the decomposition of waste material comprising organic compounds which contain sulphur, nitrogen and/or halogen and which may or may not be contaminated with inorganic or radioactive material.

Patent specification EP 0 297 738 describes a method and apparatus for electrochemical treatment of organic waste matter using an aqueous electrolyte comprising nitric acid and containing silver ions as an electrochemically regenerable primary oxidising species. Operated at a temperature between 50° C. and 90° C., the cell is particularly effective in decomposing organic waste matter. This occurs to a significant extent via secondary oxidising species produced by reaction in this temperature range of Ag(II) ions with water, a reaction which would otherwise have been regarded as parasitic because it would have been expected to reduce the efficiency of the cell for oxidising the organic matter.

Nitric acid electrolyte is advantageous for a number of applications such as when radioactive materials are being treated to destroy their organic content because many waste treatment systems already in place for dealing with radioactive materials are configured to handle aqueous waste containing nitric acid. The volatility of the acid is advantageous in such applications because it can be distilled and recovered, thereby reducing waste volumes for disposal.

Examples of use of the apparatus and method for decomposition of organic matter which is to be disposed of are described in EP 0 297 738, the disclosure of which is imported by reference herein. Forms of organic waste which have assumed importance in recent years are explosive material and chemical weapons required to be destroyed, for example, under International Treaty arrangements. The method and apparatus described in EP 0 297 738 provides a safe and effective route for disposal of such material. However, the presence of certain elements in the waste matter, particularly within complex organic components can present a problem requiring special treatment if continued efficient operation of the cell is to be maintained. In this context, the problem of phosphorus is mentioned briefly in EP 0 297 738.

We have also found that such problems arise as a consequence of the presence in the waste matter of sulphur, nitrogen and halogens. These problems and that of recovery of silver are addressed in accordance with the present invention by a modification of the method and apparatus described in EP 0 297 738.

The present invention provides, in one of its aspects, a method of treating waste matter comprising organic matter which method comprises the steps of subjecting aqueous electrolyte to an electric potential within an electrochemical cell, said electrolyte comprising nitric acid and containing ions of silver which act as an electrochemically regenerable primary oxidizing species, adding the waste matter to the electrolyte continuously or periodically, the waste matter being thereby decomposed by an oxidation process in which the primary oxidizing species is reduced, said reduced primary oxidizing species being regenerated by said electric potential, and an element selected from the group consisting of sulphur, nitrogen, chlorine, bromine or iodine and mixtures thereof containing in the waste matter accumulating in the electrolyte, withdrawing a portions the electrolyte continuously or periodically from the cell, passing the portion of electrolyte to apparatus comprising at least one reaction vessel in combination with at least one solid/liquid separator, treating the portion of withdrawn electrolyte to a precipitation, crystallization and/or distillation process to remove an element selected from the group consisting of sulphur, nitrogen, chlorine, bromine or iodine and mixtures thereof, and returning to the electrochemical cell the treated electrolyte from which said element or elements has been removed.

Although the use of cobalt in substitution for silver in such a cell is possible in principle, cobalt by itself in the electrolyte has poor electrochemical efficiency due to its slow kinetics at the electrode and in solution. However, inclusion of cobalt ions in the electrolyte in addition to silver ions can be advantageous.

Preferably the method is performed at an electrolyte temperature above 50° C. to produce secondary oxidising species from the interaction of the primary oxidising species and the aqueous electrolyte, whereby decomposition of the added waste matter by Ag (II) is enhanced by the secondary oxidising species.

It is preferable that the nitric acid has a concentration in the range 4M to 22M, but the electrolyte may comprise a mixture comprising nitric acid and sulphuric acid or a mixture comprising nitric acid and phosphoric acid.

Where the waste matter contains sulphur, the electrolyte withdrawn from the cell will contain silver, nitric acid and sulphuric acid. Separation for removal of the sulphate ions is conveniently effected by adding chloride ions, e.g. as hydrochloric acid, to precipitate silver chloride which, after separation, is converted to silver metal or silver oxide and re-dissolved in nitric acid as reconstituted electrolyte for return to the cell. The supernatant consisting of silver-free nitric and sulphuric acids is disposed of as waste either in total or after some or all of the nitric acid has been recovered by distillation. Such recovered nitric acid can be returned to the cell.

Alternatively, the electrolyte withdrawn from the cell is cooled to cause crystallisation of silver sulphate and, after separation, the sulphate-reduced electrolyte returned to the cell. The silver sulphate is converted to silver oxide by treatment with caustic alkali, to silver metal by treatment with alkali/reducing agent or to silver carbonate by treatment with $Na_2CO_3$ solution and returned to the cell.

In a further alternative according to the invention, sulphate ions are removed from the withdrawn electrolyte by direct precipitation as barium sulphate. After separation, the supernatant comprising substantially sulphate-free electrolyte is returned to the cell.

Where the waste matter contains nitrogen, some build up of nitrate in the electrolyte is acceptable or even beneficial, but excess nitrate is conveniently removed from the withdrawn electrolyte by distillation.

Where the waste matter contains chlorine or other halogens there will be direct precipitation of silver halide in the electrolyte which can be removed from the withdrawn electrolyte and treated to recover and return silver as silver metal or silver oxide.

The invention provides, in another of its aspects, apparatus for the treatment of waste matter comprising or including organic matter containing an element selected from the group consisting of phosphorus, sulphur, nitrogen, chlorine, bromine, iodine and mixtures thereof. The apparatus comprises an electrochemical cell having a cathode, an anode, a permeable separator between the anode and cathode, the permeable separator forming an anode region and a cathode region within the cell, an electrolyte comprising nitric acid and containing ions of silver, means for withdrawing catholyte from the cathode region and means for feeding fresh or regenerated catholyte to the cathode region, means for feeding the waste matter into the anode region. A separate processing plant is connected to withdraw anolyte continuously or periodically from the anode region of the cell. The plant comprises an array of a plurality of reaction vessels and a plurality of solid/liquid separators for reconstituting the withdrawn anolyte to remove therefrom the element or elements by precipitation, crystallization or distillation and means for returning reconstituted anolyte to the anode region of the cell; valve means providing connections between the plurality of reaction vessels and the solid/liquid separators whereby changing settings of the valve means causes anolyte withdrawn from the anode region to be passed through either a single combination of reaction vessel and solid/liquid separator or a plurality of combinations of reaction vessel and solid/liquid separators in succession.

BRIEF DESCRIPTION OF THE DRAWINGS

Specific constructions of apparatus and methods embodying the invention will now be described by way of example and with reference to the drawings filed herewith, in which:

FIG. 1 shows apparatus corresponding to that shown in FIG. 2 of EP 0 297 738, but incorporating modifications embodying the present invention. FIGS. 2 and 3 illustrate the modifications in greater detail.

Referring to FIG. 1, those parts of the apparatus which correspond with that shown in EP 0 297 738 will first be described briefly. An electrochemical cell 11 has a cathode compartment 12 separated by a permeable separator 13 from an anode compartment 14. A water supply 15 is connected via pump P5 to the anode compartment 14. Organic waste is also added to the anode compartment 14 and is illustrated by a source 16 connected via pump P6.

Figure 1:
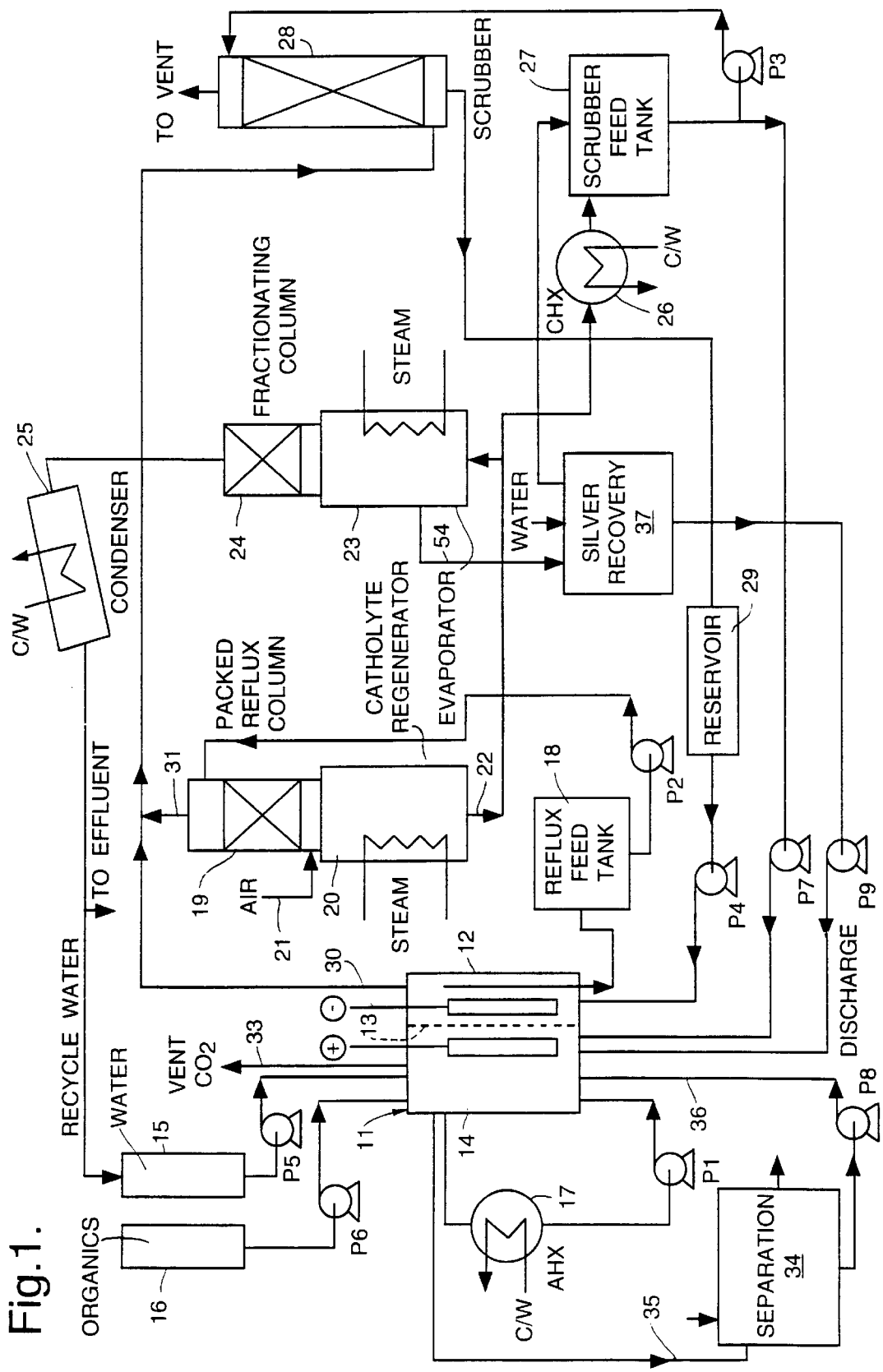
FIG. 1 is a schematic representation of apparatus for use in the decomposition of waste matter.

Anolyte temperature control is effected by a cooler 17 through which anolyte is circulated by pump P1.

For catholyte regeneration, catholyte is continuously withdrawn via a reflux feed tank 18 and pump P2 to be fed to the top of a reflux packed column 19 above a boiler 20 which contains nitric acid at the catholyte concentration and which refluxes into the packed column 19. As the catholyte containing nitric and nitrous acids descends the packed column 19 it is heated to the boiling point of refluxing nitric acid (typically 107°–112° C.) and the nitrous acid decomposes to $HNO_3$, $NO_2$, NO and water. The NO is oxidised to $NO_2$ by air or oxygen injected via duct 21. The $NO_2$ is absorbed into the liquor descending the packed column 19 so that the liquor reaching the boiler 20 is essentially pure nitric acid which is withdrawn via duct 22 at the same rate as catholyte is fed to the packed column 19.

As there is a transfer of water from anolyte to catholyte (the main current carrier being $H_3O^+$), we have found it necessary to provide for further concentration by evaporation of the product withdrawn via duct 22 from the boiler 20. For this purpose, a steam heated evaporator 23 is provided with associated fractionating column 24. The distillate from the evaporator 23 is condensed in condenser 25 and can be recycled to the water supply 15, although it may contain some nitric acid so that it may be preferred to treat this distillate as effluent.

That portion of the regenerated catholyte which is not fed to the evaporator 23 is passed via cooler 26 to a scrubber feed tank 27 from which a proportion may be returned via pump P7 to the anode compartment 14 to make up nitric acid concentration in the anolyte as described further hereinafter. The remainder of this portion of the regenerated catholyte is pumped from the scrubber feed tank 27 by pump P3 to a scrubber 28 from which it is returned via a reservoir 29 and pump P4 to the cathode compartment 12.

Ducts 30 and 31 conduct any nitrogen oxides evolved from the cathode compartment 12 or the packed column 19 to the scrubber 28 where they are absorbed in the regenerated catholyte. A vent 33 is provided for escape of carbon dioxide produced in the anode compartment.

The modifications embodying the present invention comprise a separation plant 34 connected via withdrawal duct 35 and return pump P8 and duct 36 to the anode compartment 14, and a silver recovery plant 37 with duct connections as shown to the bottom of the evaporator 23, to the scrubber feed tank 27 and, via pump P9 to the anode compartment 14. The separation plant 34 is shown in greater detail in FIG. 2 and the silver recovery plant 37 is shown in greater detail in FIG. 3.

In use, the electrochemical cell 11 is charged with an anolyte of nitric acid (typically 4–12M) containing silver nitrate (at least 0.05M), and a catholyte of nitric acid (typically 6–16M). The waste matter to be decomposed is added to the anode compartment 14. If it comprises solid matter such as tissues, rubber or plastics it is shredded beforehand. Electric potential is applied to the electrodes and the process controlled with the objective of decomposing the organic waste matter by oxidation to primarily water and carbon dioxide. In the process, water is transferred from anolyte to catholyte, as mentioned above, and the preferred reaction at a titanium, stainless steel or platinum cathode is reduction of nitric acid to nitrous acid. There is also transfer of silver ions from anolyte to catholyte and elements phosphorus, sulphur, nitrogen and halides found in organic materials will contaminate the anolyte.

It is the purpose of the separation plant 34 to deal with this contamination of the anolyte and the purpose of the silver recovery plant 37 to recover, and return to the anolyte, silver which has transferred to the catholyte.

The precise details of the process steps and their sequence for the separation plant 34 is different in dependence upon which of the above mentioned elements is contaminating the anolyte.

Figure 2:
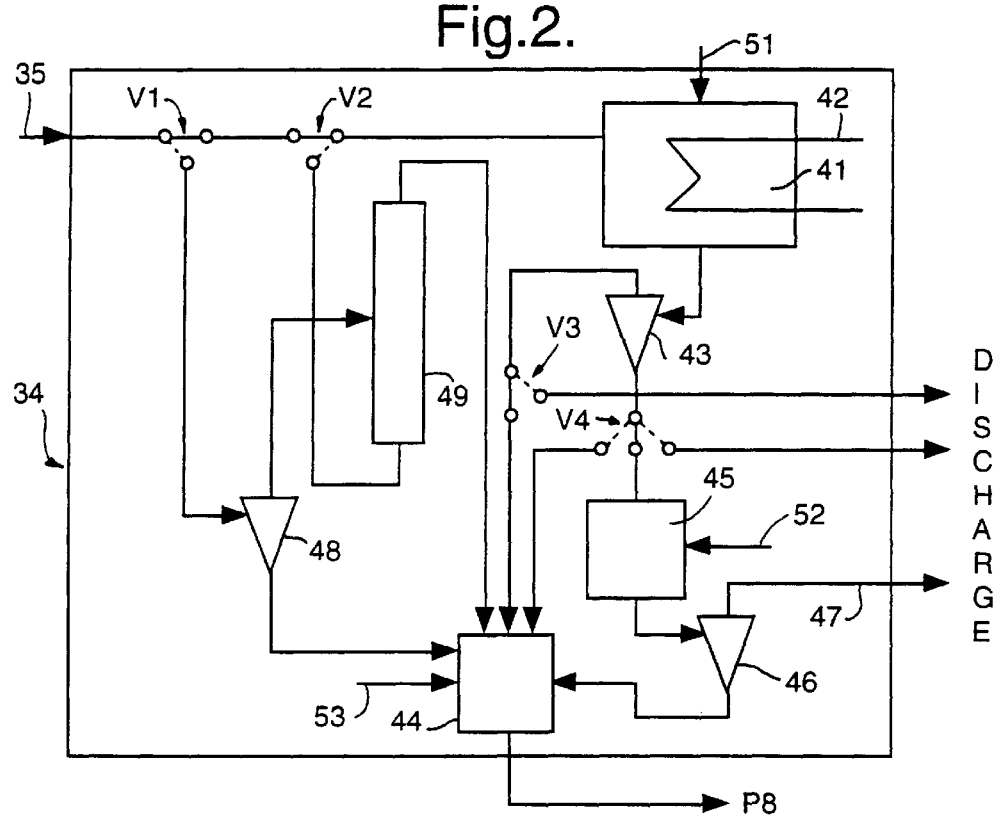
FIG. 2 is a schematic representation in greater detail of part of the apparatus shown in FIG. 1.

A composite arrangement of components is shown in FIG. 2 with valving for enabling the inclusion or omission of certain process steps. It can thus be convenient to employ the same plant for whichever of the processing steps are required. However, it will be appreciated that it may be preferable to have separate dedicated plant for each process sequence. In this case, the valving shown in FIG. 2 would not be required but the alternatives, implicit in the valving arrangements, provided by separate dedicated combinations.

Referring to FIG. 2, with valves V1 and V2 in the position shown, anolyte withdrawn from the anode compartment 14 via duct 35 is fed direct to a first treatment vessel 41 which is provided with a cooler 42. Output from this treatment vessel 41 passes to a first cyclone 43 for separating liquid from precipitated or crystallized solid material. With valve V3 in the position shown, the separated liquid passes via a mixing vessel 44 to the output of the plant 34 connected to pump P8. With valve V4 in the position shown, solids output from the first cyclone 43 passes to a second treatment vessel 45. Output from second treatment vessel 45 containing solids and liquid passes to second cyclone 46, the separated liquid from which is discharged via duct 47 and the separated solids passed to the mixing vessel 44 for dissolution and return to the anode compartment 14 via pump P8.

The alternative (dotted) position of valves V1 and V2 provides for withdrawn anolyte to be passed to a third cyclone 48 in which solids in the anolyte are removed and returned to the anode compartment 14 via mixing vessel 44 and pump P8. The separated liquid is passed to a distillation column 49, from which distillate returns to the anode compartment via mixing vessel 44 and pump P8. Residue from the distillation column 49 is passed to first treatment vessel 41.

The valves V3 and V4 provide several alternatives in which, as required:

1) The liquid fraction from first cyclone 43 can be passed direct to discharge rather than returned to mixing vessel 44.
2) The solids fraction from the first cyclone 43 can be returned directly to the mixing vessel 44 or alternatively directed straight to discharge.

The operation of the separation plant 34 for dealing with contamination of anolyte with respectively sulphate, phosphate, nitrate and chloride will now be described for each ion.

Sulphate

The valves V1, V2 and V4 are in the position shown by continuous lines. The valve V3 is in the position shown dotted. Anolyte withdrawn via duct 35 will contain silver, nitric acid and sulphuric acid. Controlled quantities of hydrochloric acid or any suitable soluble halide salt (chloride preferred in view of the greater expense of bromide or iodide salts) are supplied to the first treatment vessel 41 via duct 51 so that silver chloride is precipitated. The precipitate is separated in cyclone 43 and the supernatant, consisting of silver-free nitric and sulphuric acids passes via valve V3 to discharge. This discharge can be disposed of as waste or may be treated to recover nitric acid by distillation, in which case the nitric acid can be returned to the anolyte.

The silver chloride precipitate passes into second treatment vessel 45 for conversion to silver metal or silver oxide for recycle to the anolyte. The conversion can be effected by any one of a number of known methods, reagent being introduced via duct 52. For example, treatment of silver chloride with a large excess of strong sodium or potassium hydroxide forms $Ag_2O$ or treatment with sodium or potassium hydroxide together with a reducing agent such as hydrogen peroxide or formaldehyde will form a mixture of silver and silver oxide ($Ag_2O$). Alternatively, silver can be recovered from the silver chloride by an electrolytic process, for example by dissolution in ammonia solution and cathodic deposition.

The product metal or oxide/metal mixture is separated from the residue of liquid reagents by the second cyclone 46, from which the separated liquid is passed via duct 47 to discharge. The metal or oxide/metal mixture can be dissolved directly in the anolyte. However, it is convenient to pass it via mixing vessel 44 for dissolution in make up nitric acid introduced via duct 53.

Silver sulphate is soluble in nitric acid under the normal anolyte operating conditions up to about 100 g/l sulphate at 80° C. The solubility is less at ambient temperature or below. An alternative to precipitation of silver chloride as described above is therefore to cool the first treatment vessel 41 via cooler 42 to cause crystallization of $Ag_2SO_4$. In this case, the valves V3 and V4 are both in the position shown by continuous lines. The liquid anolyte separated in first cyclone 43 will have a reduced sulphate content and is returned via mixing vessel 44 to the anode compartment. The separated silver sulphate crystals pass to second treatment vessel 45 where they are treated with a slight excess of sodium or potassium hydroxide solution, preferably concentrated (8–12M or higher) to reduce waste volumes, at a temperature up to about 90° C. The $Ag_2SO_4$ is converted to $Ag_2O$ which is separated in the second cyclone 46 and returned to the anolyte via mixing vessel 44. The supernatant, which consists of a solution containing sodium sulphate and a little sodium or potassium hydroxide is disposed of as waste via duct 47.

A variation of this approach is to operate the anolyte at the saturation level, with $Ag_2SO_4$ present in the anolyte. In this case, there would be no need to apply cooling to first treatment vessel 41. Any crystals of $Ag_2SO_4$ are automatically separated in the first cyclone 43 and passed for treatment/further processing as described above. This approach has the advantage of controlling the level of sulphate in the anolyte automatically.

A further variation, requiring the valves V1 and V2 in FIG. 2 to be positioned as shown dotted, is useful if solids arising from the waste materials being decomposed are present in the anolyte circuit. In this variation, the anolyte is operated so as to be below the saturation level for silver sulphate and is subjected to a separation step in third cyclone 48 to remove the solids before the silver sulphate crystallization step is undertaken. Advantageously, the concentration of silver and sulphate ions in the anolyte is increased by distilling off some nitric acid and water in distillation column 49. The distillate is recycled via mixing vessel 44 and the concentrate is passed to the first treatment vessel 41 where it is subjected to cooling to precipitate the sulphate, as described above. This variation achieves a greater sulphate removal per pass than the method described above, but at the expense of greater energy requirements.

Barium sulphate, $BaSO_4$, is extremely insoluble in nitric acid. A further alternative approach to removal of sulphate is thus afforded by direct precipitation of barium sulphate. For this, valves V1, V2 and V3 in FIG. 2 are in the position shown by continuous lines and valve V4 is in the dotted position which connects the solid output from first cyclone 43 to discharge. A soluble salt of barium, which has an anion which does not cause any problems by virtue of its addition to the anolyte, such as barium hydroxide $Ba(OH)_2$ or barium nitrate $Ba(NO_3)_2$ is added at 51 to the first treatment vessel 41. This will result in precipitation of sulphate as $BaSO_4$. Sulphate-free liquid from first cyclone 43 is returned via mixing vessel 44 to the anode compartment. The barium sulphate is passed direct to discharge.

If solids are present in the circulating anolyte, these are desirably removed by a separation step (as by third cyclone 48, but without a subsequent distillation step) prior to the barium sulphate precipitation step.

Direct precipitation as barium sulphate in this way is the simplest approach to sulphate removal, but does generate a relatively large volume of solid (but inert) waste for disposal.

Calcium sulphate, $CaSO_4$ is a possible alternative insoluble sulphate for precipitation. However, it is slightly soluble in the nitric acid electrolyte and some $Ca^{2+}$ would be left in solution in the returning anolyte. These ions would ultimately accumulate in the catholyte system, from which they would have to be removed for example by crystallization as calcium nitrate.

Phosphate

All metal phosphates, including silver phosphate ($Ag_3PO_4$) are too soluble in nitric acid to permit direct precipitation from the anolyte. The approach to phosphate removal is therefore based on operating with phosphate in the anolyte but at a concentration which is such as will not materially affect the operation of the process, such as by unacceptably increasing the corrosivity of the anolyte or reducing process efficiency.

The separation plant of FIG. 2 is operated with the valves V1 and V2 in the position shown by continuous lines. Valve V3 is in the dotted position for connection direct to discharge and valve V4 is in the dotted position for return of the solids fraction from first cyclone 43 to the anode compartment via mixing vessel 44. Alkali or alkali metal carbonate reagent is added at 51 to the first treatment vessel 41 to neutralise the withdrawn anolyte. Silver orthophosphate, $Ag_3PO_4$ is precipitated in the form of a very "well-behaved" granular solid. The supernatant liquid separated in first cyclone 43 contains sodium nitrate and sodium phosphate and is passed direct to discharge as waste.

The silver phosphate in the form of orthophosphate is recycled directly to the anolyte along with fresh nitric acid added via duct 53 to make up for the acid removed and neutralised. This is acceptable, because relatively little phosphate is recycled along with each mole of Ag. For example, the typical anolyte silver concentration would be about 0.5M and a phosphate limit of 1–2M would be applied. In this case the reconstituted anolyte would contain 0.5M Ag and 0.17M phosphate.

If nevertheless, it is desired to recycle no phosphate with the silver, the $Ag_3PO_4$ may be converted to the metal or oxide by known treatments such as those described for silver chloride above. Alternatively, the silver may be precipitated as silver chloride and converted to Ag or $Ag_2O$ as described above.

Here again, if solids are present in the circulating anolyte, it is desirable to separate these (as by third cyclone 48, but without the subsequent distillation) before the anolyte is passed to the first treatment vessel 41.

Nitrate

Organic nitrogen appears, in whole or in part, as nitrate after oxidation. If only minor amounts of nitrogen are present in the waste matter being oxidised, the nitrate formed in the anolyte may be tolerable or indeed beneficial in that it will offset minor losses from the system via nitrogen oxides or acid fuming. However, when large amounts of nitrate are formed, for example from the oxidation of highly nitrated species such as explosives, it is necessary to remove nitrate from the anolyte as nitric acid. This is most conveniently effected by distillation. The nitric acid distillate is removed from the system, but can be recovered as a resource for sale or re-use elsewhere. If the anolyte is relatively dilute, the condensate will be even more dilute and probably not worth recycling, in which case it would be treated as a waste stream. However, if the system is operated with anolyte acid concentration at the azeotropic composition of 65.5% $HNO_3$ (about 16M), then the condensate is of the same composition and therefore readily recycled to make up for minor losses.

Chloride

Organic chlorine tends to appear after oxidation as AgCl, although some chlorine gas may be evolved from the anolyte due to oxidation of chloride ions because silver chloride is very slightly soluble in nitric acid.

The operation of the separation plant 34 for removal of silver chloride is identical to that described in the first method for dealing with sulphate, except that addition of chloride to precipitate silver chloride is obviously not required. The treatment of the silver chloride precipitate for recovery of and recycle of silver as metal or oxide is otherwise identical.

Figure 3:
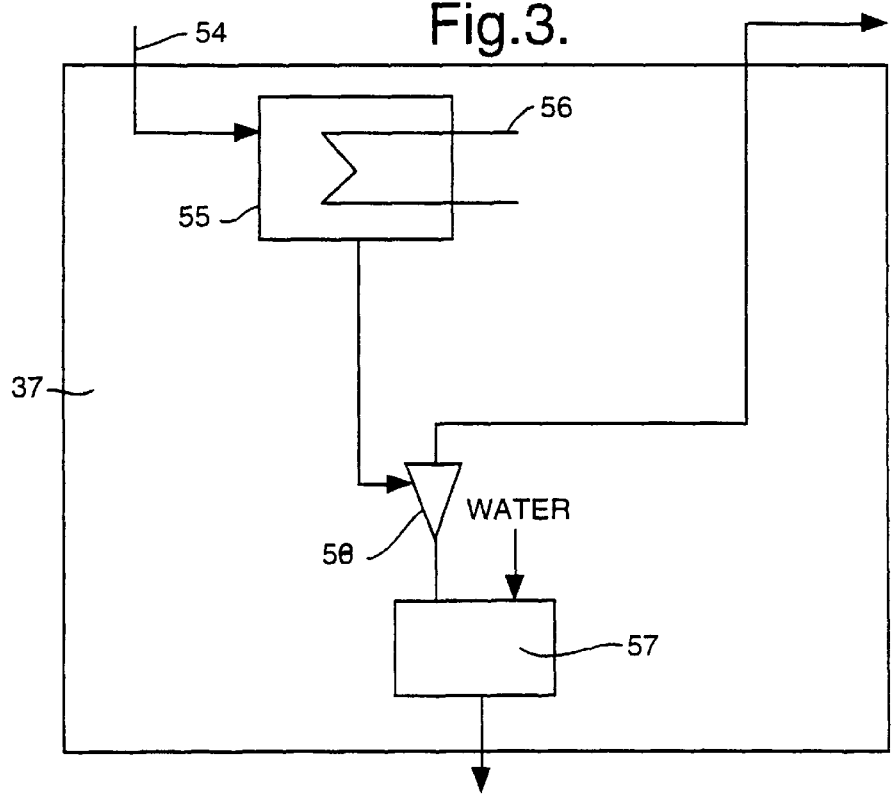
FIG. 3 is a schematic representation in greater detail of another part of the apparatus shown in FIG. 1.

FIG. 3 shows the plant 37 for recovering silver from the catholyte. All ions in solution in the anolyte as cations will migrate at their characteristic rate across the separator 13 to the catholyte under the influence of the electric field gradient between the electrodes. The silver present in the anolyte will obviously be subject to this migration so that, if no steps are taken to counter the transfer, silver concentration in the anolyte will fall and in the catholyte will rise as operation of the process takes place.

The most concentrated solution in the catholyte system is in the evaporator bottoms (23). A sidestream is withdrawn via duct 54 and fed to a treatment vessel 55 with a cooler 56. The cooling will result in precipitation of silver nitrate crystals, which are separated in cyclone 58, redissolved in water in a mixing vessel 57 and returned via pump P9 to the anode compartment 14. The liquid catholyte, reduced in silver content, from the cyclone 56 is reunited with regenerated catholyte from boiler 20 in scrubber feed tank 27.

In the absence of any other process or operation which removes nitrate from the anolyte, the above described process for recovery of silver from the catholyte will have the effect of increasing the anolyte nitrate concentration. In this case, it is preferable to convert the silver nitrate to silver metal, silver oxide or silver carbonate by reduction (chemical or electrochemical) or precipitation using a soluble hydroxide or carbonate, prior to recycle to the anolyte.

It will be appreciated that in practice waste material undergoing decomposition will give rise to more than one of the anions discussed above. In some cases, combined treatment will be relatively straightforward as with arisings of sulphate and chloride together. In other circumstances, it may be necessary to provide more than one separation plant operating simultaneously in different modes, or it may be possible to deal with a mixture of anion arisings using a single separation plant 34 switched periodically between different modes.

The invention is not restricted to the details of the foregoing examples. For instances, the concentration ranges specified are those regarded as desirable for satisfactory operation, but the plant is capable of operating at acid and silver concentrations outside these ranges. Cyclones have been described for separation of solids from liquids but any other convenient separation process, such as filtration or centrifugation can be employed. References have been limited to chlorine and chloride for simplicity of description, but it will be appreciated that where equivalent chemistry applies to the other halogens, corresponding processes can be adopted. Streams described as being discharged from the system may either be discharged directly to, for example, a sewer or subjected to appropriate treatment to comply with any relevant regulatory restrictions on salts, nitrate, phosphate, etc in such discharges.

We claim:

1. A method of treating waste matter comprising organic matter which method comprises the steps of:
   (i) subjecting aqueous electrolyte to an electric potential within an electrochemical cell, said electrolyte comprising nitric acid and containing ions of silver which act as an electrochemically regenerable primary oxidizing species, (ii) adding said waste matter to said electrolyte continuously or periodically, said waste matter being thereby decomposed by an oxidation process in which said primary oxidizing species is reduced, said reduced primary oxidizing species being regenerated by said electric potential and an element selected from the group consisting of sulphur, nitrogen, chlorine, bromine or iodine and mixtures thereof contained in the waste matter accumulating in the electrolyte, (iii) withdrawing a portion of said electrolyte continuously or periodically from the cell, (iv) passing said portion of electrolyte to apparatus comprising at least one reaction vessel in combination with at least one solid/liquid separator, (v) treating said portion of withdrawn electrolyte to a precipitation, crystallization and/or distillation process to remove an element selected from the group consisting of sulphur, nitrogen, chlorine, bromine or iodine and mixtures thereof, and (vi) returning to said electrochemical cell the treated electrolyte from which said element or elements has been removed.

2. A method as claimed in claim 1, wherein cobalt ions are included in the electrolyte in addition to silver ions.

3. A method as claimed in claim 2, wherein the method is performed with the electrolyte temperature above 50° C. to produce secondary oxidizing species from the interaction of the primary oxidizing species and the aqueous electrolyte.

4. A method as claimed in claim 1, wherein the method is performed with the electrolyte temperature above 50° C. to produce secondary oxidizing species from the interaction of the primary oxidizing species and the aqueous electrolyte.

5. A method as claimed in claim 1, wherein the nitric acid has a concentration in the range 4M to 22M.

6. A method as claimed in claim 1, wherein the electrolyte comprises a mixture of nitric acid and sulphuric acid.

7. A method as claimed in claim 1, wherein the electrolyte comprises a mixture of nitric acid and phosphoric acid.

8. A method as claimed in claim 1, wherein the waste matter contains sulphur and separation for removal of sulphate ions is effected by adding chloride ions to precipitate silver chloride which, after separation, is converted to silver metal or silver oxide and redissolved in nitric acid as reconstituted electrolyte for return to the cell, whilst the supernatant consisting of substantially silver-free nitric and sulphuric acids is further processed or disposed of.

9. A method as claimed in claim 8 wherein, some or substantially all of the nitric acid is recovered from the supernatant by distillation and the remaining sulphuric acid and any nitric acid not recovered is disposed of.

10. A method as claimed in claim 9, wherein the nitric acid recovered from the supernatant is returned to the cell.

11. A method as claimed in claim 1, wherein said waste matter contains sulphur and the electrolyte withdrawn from the cell is cooled to cause crystallization of silver sulphate and, after separation, the sulphate-reduced electrolyte returned to the cell.

12. A method as claimed in claim 11, wherein the silver sulphate is converted to silver oxide by treatment with caustic alkali and returned to the cell.

13. A method as claimed in claim 11, wherein the silver sulphate is converted to silver metal, by treatment with an alkali combined with a reducing agent, and returned to the cell.

14. A method as claimed in claim 11, wherein the silver sulphate is converted to silver carbonate by treatment with $Na_2CO_3$ solution, and returned to the cell.

15. A method as claimed in claim 1, wherein the waste matter contains sulphur and sulphate ions are removed from the withdrawn electrolyte by direct precipitation as barium sulphate and, after separation, the supernatant electrolyte is returned to the cell.

16. A method as claimed in claim 1, wherein the waste matter contains chlorine or other halogens and there will be direct precipitation of silver halide in the electrolyte, the silver halide precipitate being separated and treated to recover and return to the cell the silver as silver metal or silver oxide.

17. Apparatus for the treatment of waste matter comprising or including organic matter containing an element selected from the group consisting of phosphorus, sulphur, nitrogen, chlorine, bromine, iodine and mixtures thereof, which apparatus comprises an electrochemical cell having a cathode, an anode, a permeable separator between said anode and cathode, said permeable separator forming an anode region and a cathode region within said cell, an electrolyte comprising nitric acid and containing ions of silver, means for withdrawing catholyte from said cathode region and means for feeding fresh or regenerated catholyte to said cathode region, means for feeding the waste matter into said anode region, a separate processing plant connected to withdraw anolyte continuously or periodically from said anode region of said cell, said plant comprising an array of a plurality of reaction vessels and a plurality of solid/liquid separators for reconstituting said withdrawn anolyte to remove therefrom said element or elements by precipitation, crystallization or distillation and means for returning reconstituted anolyte to said anode region of said cell; valve means providing connections between said plurality of reaction vessels and said solid/liquid separators whereby changing settings of said valve means causes anolyte withdrawn from said anode region to be passed through either a single combination of reaction vessel and solid/liquid separator or a plurality of combinations of reaction vessel and solid/liquid separators in succession.

\* \* \* \* \*